Nov. 27, 1923.  1,475,208
I. TROLLEY
TRACTOR CONNECTION FOR AGRICULTURAL IMPLEMENTS
Original Filed July 17, 1918   10 Sheets-Sheet 1

INVENTOR
Isaac Trolley
BY
Rogers, Kennedy Campbell
ATTORNEYS

Nov. 27, 1923.          1,475,208
I. TROLLEY
TRACTOR CONNECTION FOR AGRICULTURAL IMPLEMENTS
Original Filed July 17, 1918    10 Sheets-Sheet 3

INVENTOR
Isaac Trolley
BY
Rogers, Kennedy & Campbell
ATTORNEYS

Nov. 27, 1923.

I. TROLLEY 1,475,208

TRACTOR CONNECTION FOR AGRICULTURAL IMPLEMENTS

Original Filed July 17, 1918     10 Sheets-Sheet 5

INVENTOR
Isaac Trolley
BY
Rogers, Kennedy & Campbell
ATTORNEYS

Nov. 27, 1923.
1,475,208

I. TROLLEY

TRACTOR CONNECTION FOR AGRICULTURAL IMPLEMENTS

Original Filed July 17, 1918    10 Sheets-Sheet 6

Nov. 27, 1923.                                              1,475,208
                         I. TROLLEY
        TRACTOR CONNECTION FOR AGRICULTURAL IMPLEMENTS
            Original Filed July 17, 1918    10 Sheets-Sheet 8

Fig. 8.

INVENTOR
Isaac Trolley
BY
Rogers, Kennedy Campbell
ATTORNEYS

Nov. 27, 1923.
I. TROLLEY
1,475,208
TRACTOR CONNECTION FOR AGRICULTURAL IMPLEMENTS
Original Filed July 17, 1918   10 Sheets-Sheet 9
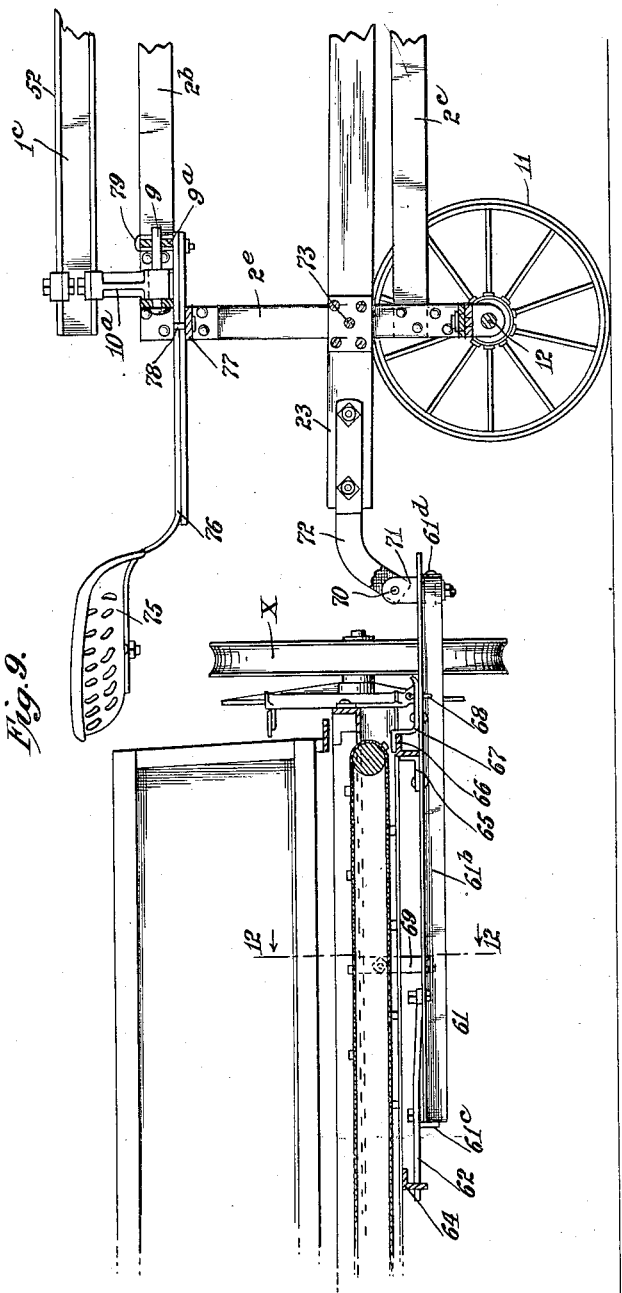
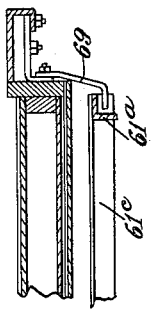
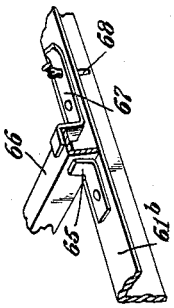
INVENTOR
Isaac Trolley
BY
Rogers, Kennedy Campbell
ATTORNEYS Nov. 27, 1923.
I. TROLLEY
1,475,208
TRACTOR CONNECTION FOR AGRICULTURAL IMPLEMENTS
Original Filed July 17, 1918    10 Sheets-Sheet 10
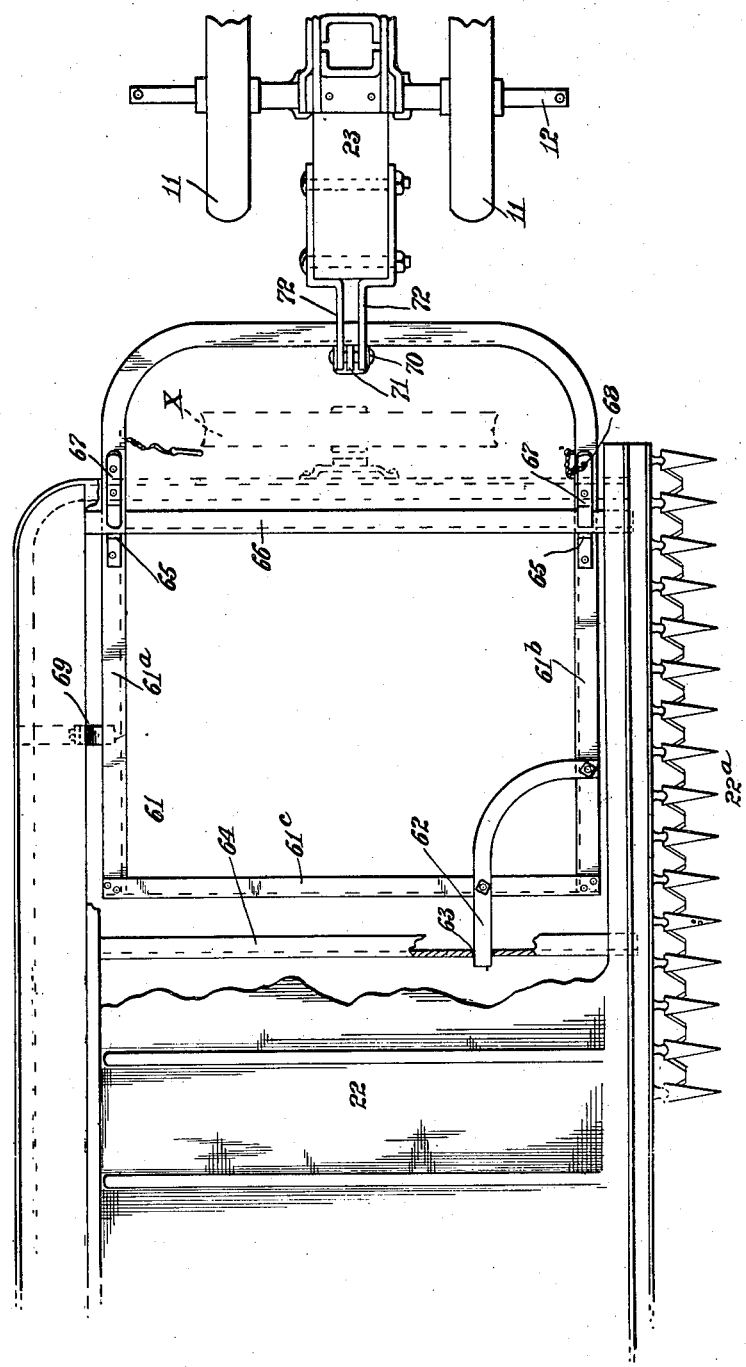

Patented Nov. 27, 1923.

1,475,208

UNITED STATES PATENT OFFICE.

ISAAC TROLLEY, OF POUGHKEEPSIE, NEW YORK, ASSIGNOR, BY MESNE ASSIGNMENTS, TO MOLINE PLOW COMPANY, INCORPORATED, OF MOLINE, ILLINOIS, A CORPORATION OF VIRGINIA.

TRACTOR CONNECTION FOR AGRICULTURAL IMPLEMENTS.

Original application filed July 17, 1918, Serial No. 245,410. Divided and this application filed July 28, 1919. Serial No. 313,706.

*To all whom it may concern:*

Be it known that I, ISAAC TROLLEY, a citizen of the United States, residing at Poughkeepsie, in the county of Dutchess and State of New York, have invented certain new and useful Improvements in Tractor Connections for Agricultural Implements, of which the following is a specification, reference being had therein to the accompanying drawing.

The invention relates to tractor connections for agricultural implements.

It is particularly directed to that feature of the connections by means of which a binder may not only be connected to the tractor in operative position but may also be readily connected in transport position.

The tractor herein disclosed and to which my improvements are peculiarly applicable, consists of a power unit supported by two power driven tractor wheels, and having a rearwardly extending beam or frame member, which latter is supported so as to preserve the horizontal equilibrium of the power unit, by means of a supporting truck capable of certain limited movements relative to the power unit, the draft of the power unit being applied to the truck, and through the medium of the truck, applied to the implement to be hauled. The control of the tractor by the driver is effected from the usual driver's seat on the implement by means of appropriate controlling devices supported by the implement, and from which suitable operating rods extend forwardly to the mechanism of the tractor, the said controlling levers and devices being detachable from the implement and being applied to the tractor and operated by the driver from a seat on the tractor, when the implement is connected to the tractor for transportation, or when the tractor is disconnected from the implement and used independently thereof.

In the accompanying drawings:

Fig. 8 is a perspective view showing the binder connected with the tractor for transportation.

Fig. 9 is a side elevation on an enlarged scale partly in section, showing the connection of the tractor with the binder when the latter is transported by the tractor.

Fig. 10 is a top plan view of the same.

Fig. 11 is a fragmentary sectional perspective view showing one of the latches for holding the connecting frame in place on the grain platform.

Fig. 12 is a transverse section on the line 12—12 of Fig. 9 of one of the side frames showing particularly the construction of the catch 69 illustrated in plan in Figure 10.

Figure 1:
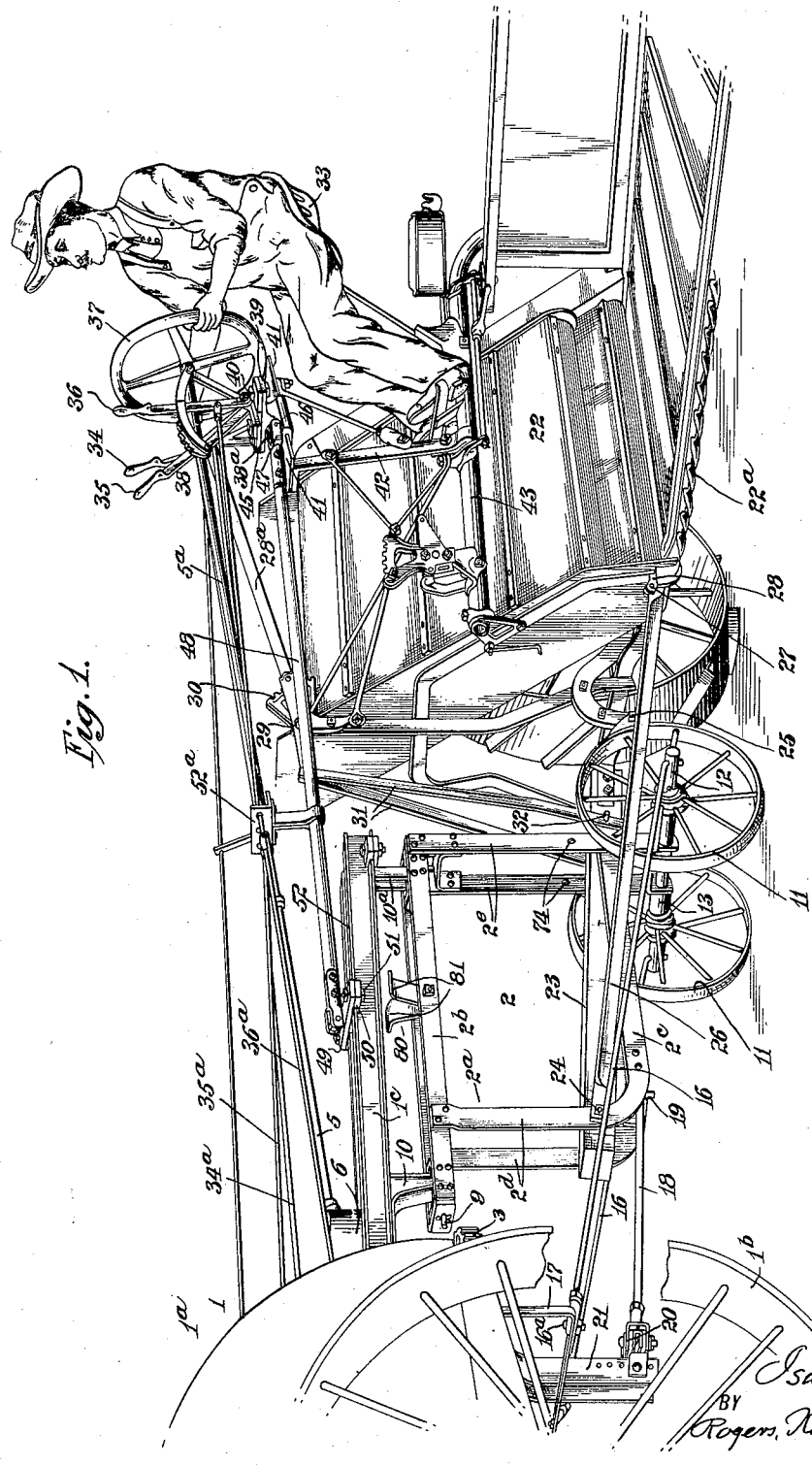
Fig. 1 is a perspective view of the rear portion of a tractor and the stubble end of a grain binder, showing the two connected in accordance with my invention for operation in the field.
Figure 2:
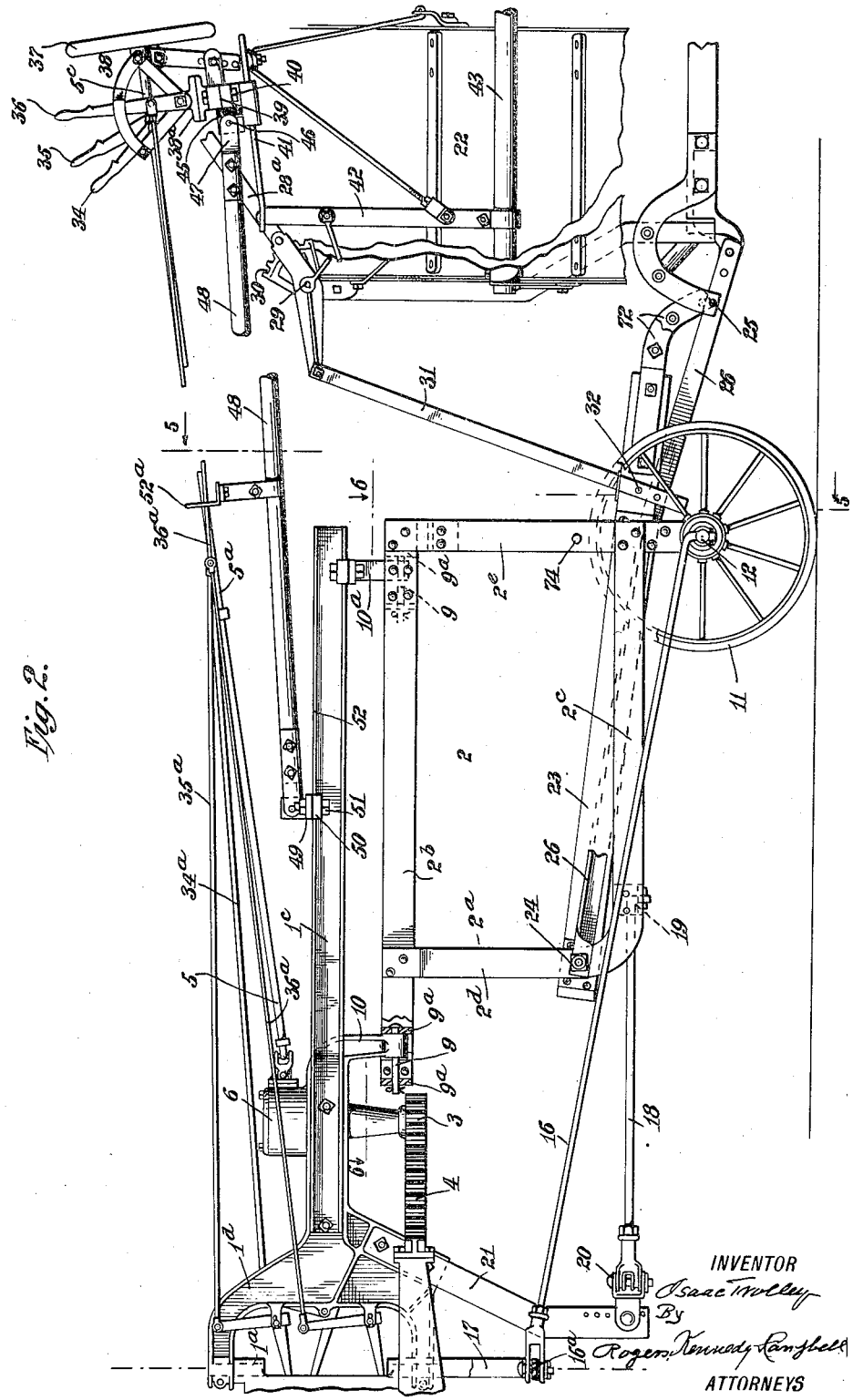
Fig. 2 is a side elevation of the same on a slightly enlarged scale.
Figure 3:
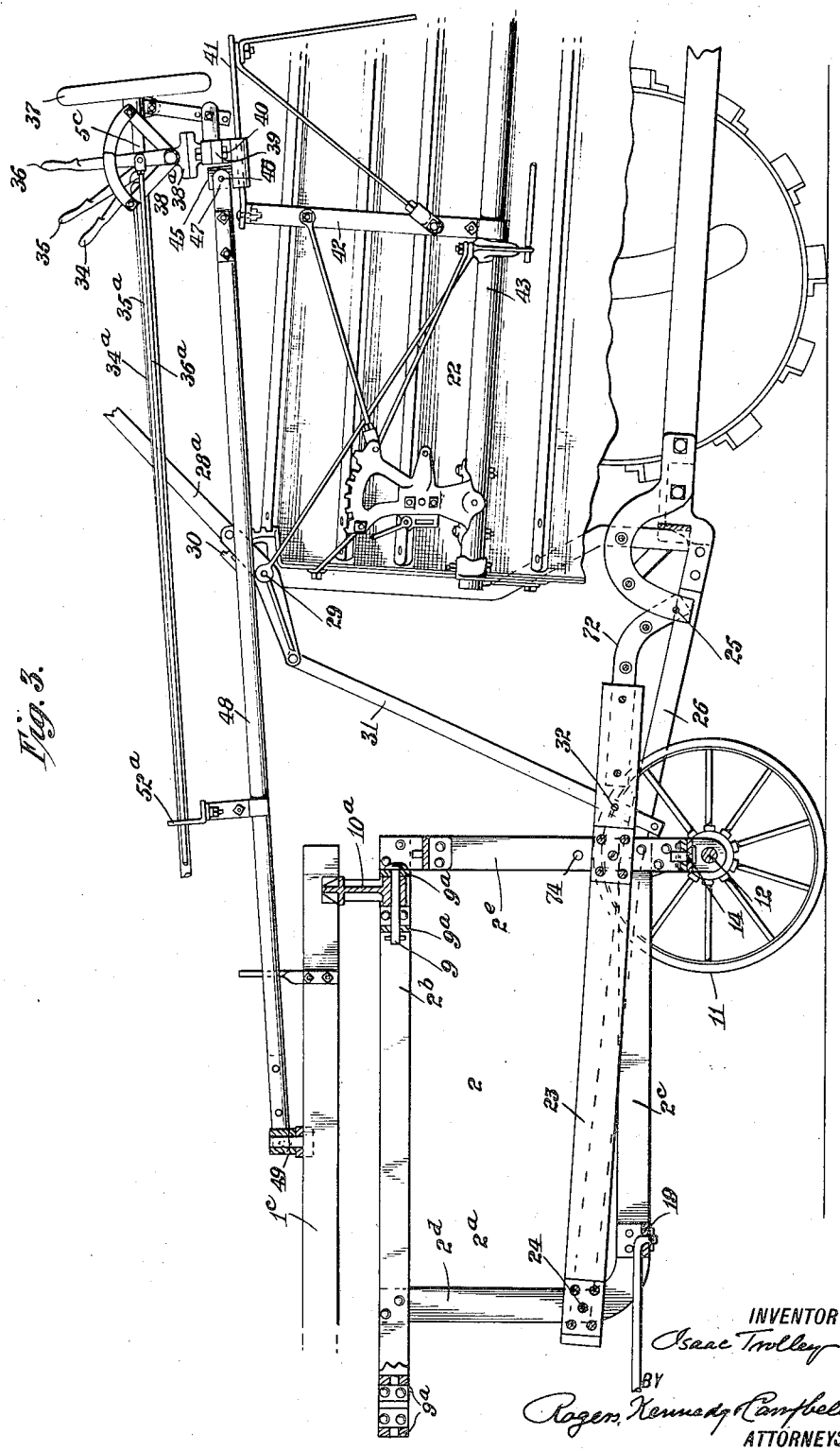
Fig. 3 is a similar view with the parts in a different position.
Figure 4:
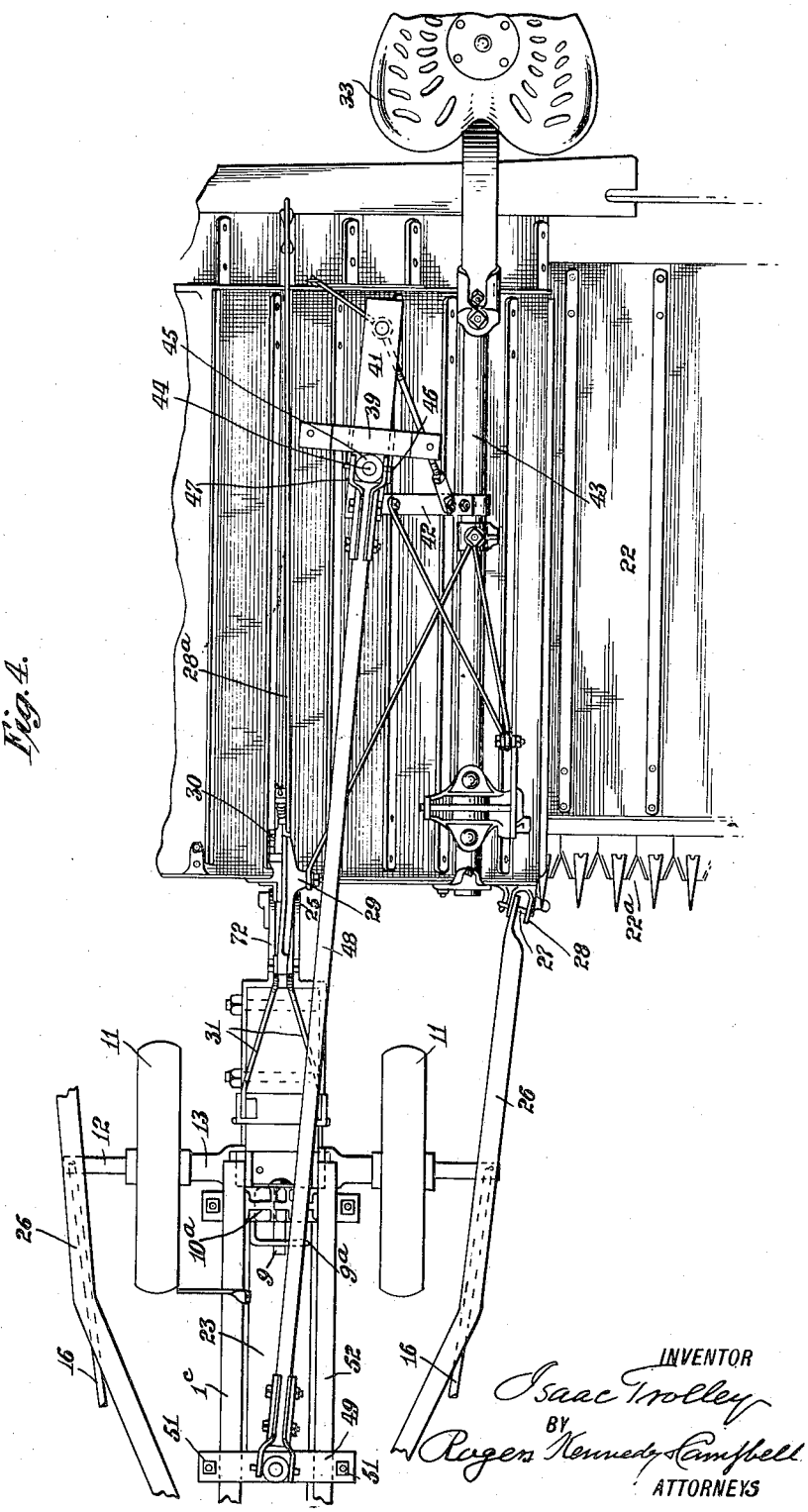
Fig. 4 is a plan view of the construction shown in Fig. 3 with certain parts removed.
Figure 5:
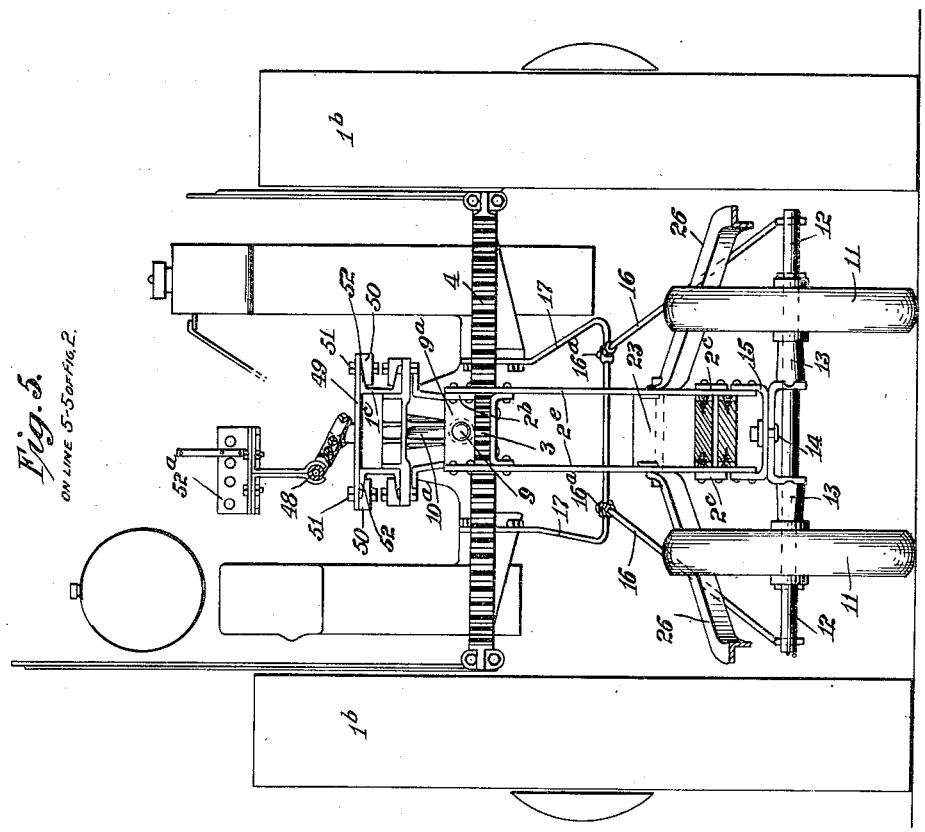
Fig. 5 is a sectional elevation on the line 5—5 of Fig. 2.
Figure 6:
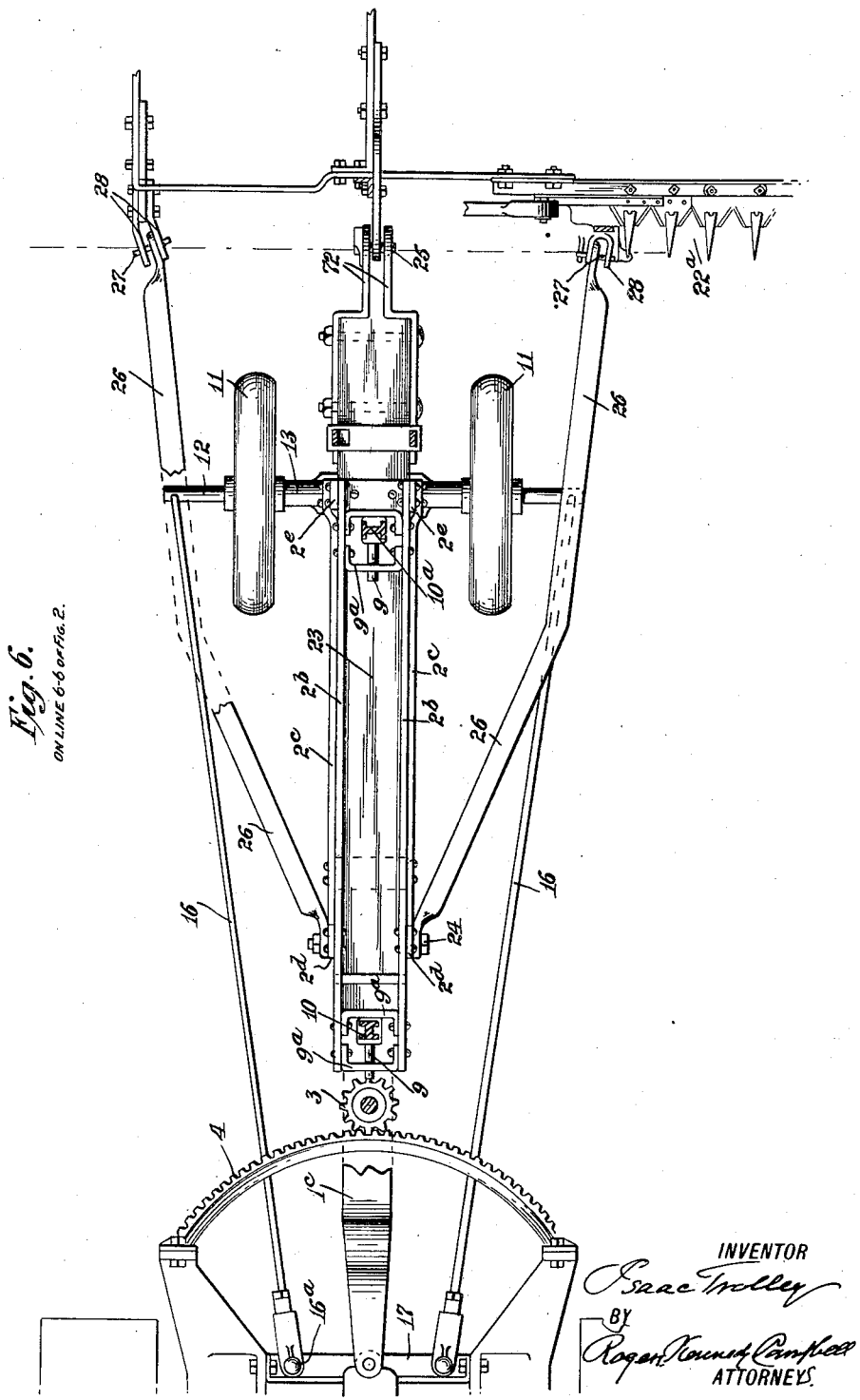
Fig. 6 is a horizontal sectional plan view on the line 6—6 of Fig. 2.

Referring to the drawings:

Referring particularly to Figs. 1 to 8, 1 indicates a tractor consisting of a power unit $1^a$ and a supporting truck 2. The power unit is operated preferably by a gas engine mounted in a frame $1^a$ supported by two power operated traction wheels $1^b$, extending from which frame is a horizontal beam or frame bar $1^c$, the forward end of which is in the form of a yoke $1^d$ pivoted to the frame $1^a$, on a vertical axis so that the frame may swing horizontally relatively to the beam. Carried by the beam is a horizontal rotary pinion 3 which meshes with a horizontal rack 4 fixed to the frame $1^a$ and curved from a center coincident with the axis of the yoke, the rotation of the pinion, assuming that the beam is held against lateral motion, causing the frame $1^a$ and parts of the power unit carried thereby to turn relatively to the beam, by which means the guiding of the tractor is effected. The pinion is operated by an operating shaft 5 suitably geared to the pinion as at 6 and extending rearwardly within reach of the driver, as will be more particularly described hereinafter.

Figure 7:
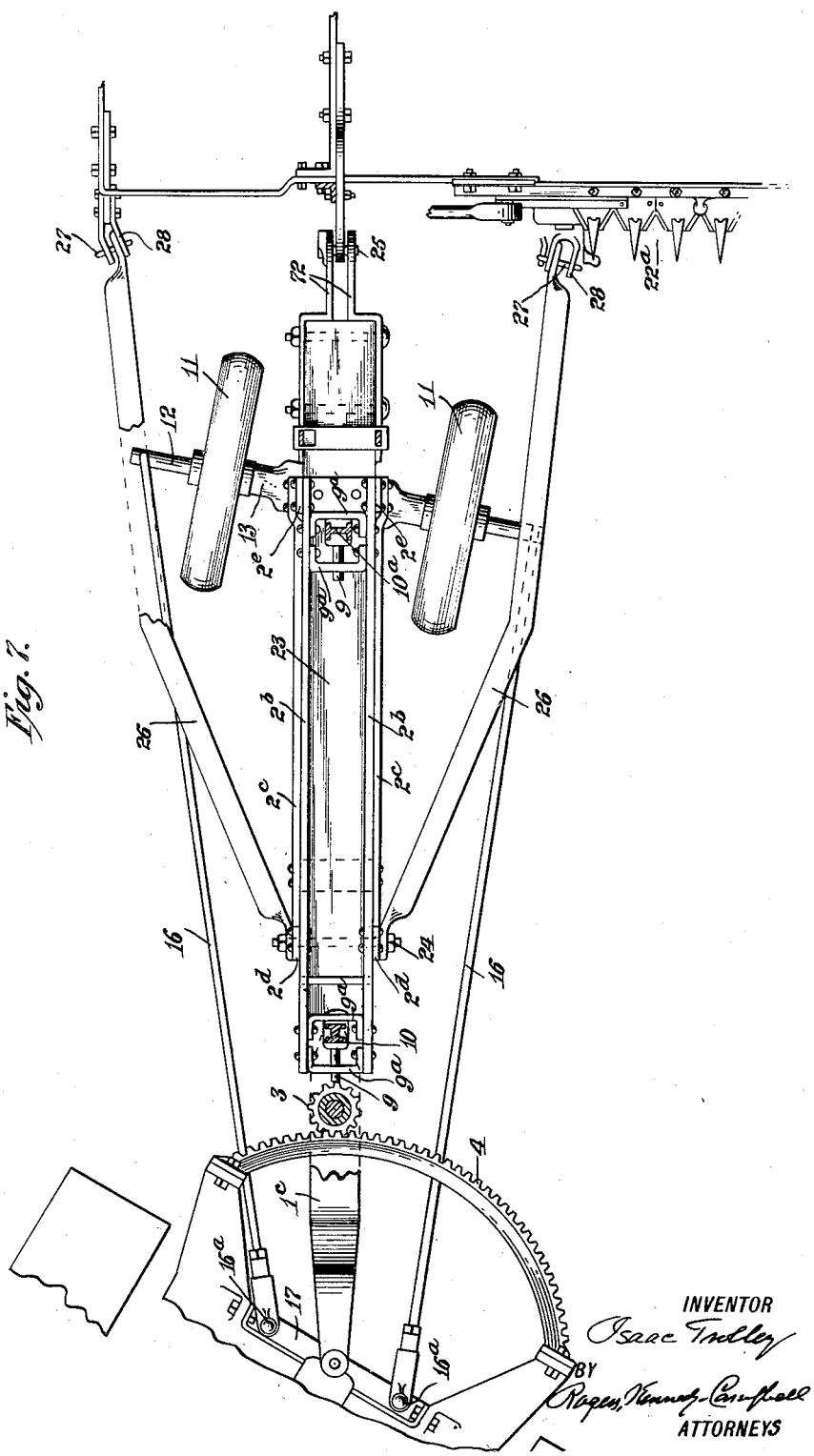
Fig. 7 is a similar view with the parts in a different position.

The supporting truck 2 extends beneath the beam 1ᶜ and supports the same, thereby preserving the horizontal equilibrium of the power unit. This truck is in the form of two upright open rectangular frames 2ᵃ connected together side by side in fixed spaced relations, and constituting a unitary frame structure with spaced upper and lower horizontal bars 2ᵇ and 2ᶜ, and spaced front and rear vertical bars 2ᵈ and 2ᵉ. The upper bars 2ᵇ have fixed between them at the front and rear, horizontal longitudinally extending supporting pins 9 mounted in cross plates 9ᵃ fixed between the bars, upon which pins are respectively mounted so as to rock and slide thereon, the lower ends of two arms 10 and 10ᵃ depending from the beam 1ᶜ respectively at its front and rear. By this means the truck frame is capable of a limited motion relative to the beam both in a fore and aft direction, and about a fore and aft axis, as will be more particularly described hereinafter. The rear end of the truck frame is supported from the ground by two truck wheels 11 journaled on a horizontal axle 12 carried in a yoke or frame 13 pivoted on a vertical axis as at 14 to a hanger strap 15 connected fixedly to the lower ends of the rear vertical bars 2ᵉ of the truck frame. The outer extremities of the axle are formed with vertical holes in which extend the rear downwardly turned ends of two fore and aft rods 16 whose forward ends are pivoted on vertical axes as at 16ᵃ to a hanger bracket 17 fixed to the frame 1ᵃ of the power unit, the pivotal connection of the rods with the bracket being on opposite sides of the axis of the yoke 1ᵈ. As a result of this construction and arrangement, when the frame of the power unit is turned relative to the beam 1ᶜ in steering the tractor, the truck wheels will be swiveled or turned in the same direction as shown in Fig. 7, thereby effecting a quick and short turn of the machine.

The draft of the power unit is transmitted to the truck by means of a draft rod or link 18 having its rear end turned downwardly and entered loosely in a hole in a horizontal bracket plate 19 fixed between the lower horizontal bars 2ᶜ of the truck frame at the front. This draft rod extends forwardly and is pivoted by means of a vertical pivot pin to a clevis 20, which in turn is pivotally connected by means of a horizontal pivot pin to the lower end of a draft arm 21 depending from the yoke 1ᵈ.

To adapt the tractor for connection with certain forms of farm implements, for instance a grain binder 22 as shown in the accompanying drawings to pull the same through the field for operation on the grain, a draft member in the form of a stub tongue 23 is provided which is pivoted at its forward end by means of a horizontal pivot bolt 24 between the two front vertical bars 2ᵈ of the truck frame near the lower ends of said bars, the said tongue extending rearwardly between the rear bars of the truck frame and beyond the same where it is connected pivotally by means of a horizontal pivot pin 25 with the frame of the binder in a manner similar to the connection of the usual draft tongue therewith. In connection with this draft member or stub tongue as the means for applying the draft of the tractor to the binder frame, I employ two side draft bars 26 whose forward ends are pivoted to the truck frame on the pivot bolt 24 before alluded to, and which draft bars diverge rearwardly and have their rear ends widely separated and pivotally connected by horizontal pivot pins 27 respectively between two pairs of ears 28 on the binder frame, the axes of the pivot pins 27 and the pivot pin 25 being in horizontal coincidence as shown more particularly in Fig. 6. Due to this pivotal connection of the binder frame with the truck frame, the binder frame and consequently the grain platform may be rocked or tilted about the transverse axes of the bull and grain wheels, which tilting action will be in relation to the tractor and will raise and lower the cutter bar 22ᵃ. In other words, I provide a flexible or articulated connection between the tractor and binder frame so that the height of the cutter bar may be adjusted from the ground to vary the point of attack on the grain, and also so that the weight and down-drag of the tractor will not be imposed on the binder.

The adjustment of the binder frame relative to the tractor is effected by the usual platform adjusting member 28ᵃ, (Figs. 1 and 3) pivoted near its lower end on a horizontal axis as at 29 to a fixed part of the binder frame alongside a segment frame 30 fixed to the elevator frame at its front, the lever being provided with the usual locking latch (not shown) to engage between the teeth of the segment frame and thereby hold the lever and connected parts in their different adjusted positions. The lower extremity of the lever is pivoted to the upper ends of two upright links 31 extending at their lower ends on opposite sides of the stub tongue 23 near its rear end and pivotally connected thereto by a horizontal pivot bolt 32. By pushing the lever forwardly, the binder frame will be tilted on the axes of the bull and grain wheels, which will raise the front of the platform and cutter bar, the stub tongue in this action moving upwardly with the connected parts; and by pulling the lever rearwardly these movements will be reversed, the lever being retained in its adjusted position by locking the same to the segment frame. These adjustments as before stated are in relation to the tractor, the entire weight of the same being borne conjointly by the front traction wheels 1^b and the rear truck wheels 11, and by reason of the pivotal connection of the binder with the tractor, which allows the two to move up and down relatively to each other in passing over uneven ground, such weight is not imposed on the binder frame, the latter as it trails behind the tractor, being subject only to the draft pull of the power unit exerted through the truck.

The control of the tractor mechanism by the driver is effected from the usual driver's seat 33 on the binder frame by control devices in the form of levers 34, 35 and 36 for controlling the clutch, gear shaft, and gas, and the hand wheel 37 connected with an extension 5^a of the shaft 5 before alluded to for guiding the tractor. This extension shaft has a bearing near its outer end in an arm 5^c extending upwardly from a frame or support 38. The control levers have operating rods 34^a, 35^a and 36^a connected with them and extending to the tractor mechanism, and said levers are mounted on the support 38 which has a base plate 38^a seated on a flat bracket plate 39 and detachably connected thereto by means of fastening bolts 40 extending through the base plate and bracket plate, whereby the support is readily detachable from the bracket plate. The ends of the bracket plate are extended downwardly around and beneath the edges of a fixed guide plate 41 by which means the support carrying the control levers is capable of a sliding movement relative to the binder frame in a fore and aft direction, the purpose of which will presently appear. The guide plate 41 is sustained fixedly in position in front of the driver's seat by means of a standard 42 extending upwardly from the fixed seat pipe 43 and is fixedly braced from the binder frame by suitable brace rods. The base plate 38^a of the support 38 has projecting upwardly from it a fixed stud 44 (see Fig. 4) on which is loosely mounted a collar 45 provided with pins 46 projecting outwardly therefrom, which pins extend loosely through a yoke 47 on the rear end of a rod or link 48, whereby a gimbal or universal joint is formed between the link and the supporting frame 38. The link has its forward end connected in a like manner to a plate 49 (see Fig. 2) seated on the beam 1^c and clamped adjustably in place thereon by clamping plates 50 seated against the under sides of the projecting ends of the plate 49 and detachably fastened thereto by bolts 51, the said clamping plates extending inwardly and bearing against the under sides of edge flanges 52 on the beam.

The supporting frame 38 sliding on the guide plate 41 and tied to the tractor beam by the link 48 connected with the beam and frame by universal joints, permits the tractor and binder frame to move relatively to each other both vertically, horizontally and sidewise in the travel of the machine over uneven ground, and in the adjustments of the binder frame relatively to the tractor, without bringing any strain to bear on the connecting rods between the controlling levers and the mechanism of the tractor, while at the same time the link 48 preserves the same distance between the tractor and controlling levers irrespective of the changing relations and distance between the binder frame and tractor. The connecting rods 34^a, 35^a and 36^a and the extension of the operating shaft 5 are guided and supported between their ends in the long stretch between the tractor and controlling levers, by means of a vertical guide plate 52 fixed to the upper end of an arm extending upwardly from and fixed to the link 48 and provided with holes through which the rods and shaft loosely extend. The connecting rods 34^a, 35^a and 36^a are formed each of a forward section and a rear extension section which are connected together detachably, so that the extensions may be removed when the controlling levers are transferred to the tractor, as will be presently described.

The form, construction and arrangement of the parts above described, for the attachment of the binder frame to the tractor in operative position and the control of the tractor are such that the binder and tractor may be speedily and readily disconnected from each other and the binder connected in inoperative position to the tractor for transportation. When so connected the driver controls the tractor from a seat on the tractor as shown in Figs. 8 to 12 inclusive, the supporting frame 38 for the controlling levers being transferred from the binder frame to the beam 1^c of the tractor, and a special connecting frame being provided for attaching the grain platform of the binder to the tractor truck.

In making this change for the transportation of the binder, the side draft bars 26 are disconnected at their rear ends from the binder frame, likewise the rear end of the stub tongue 23; and the lower ends of the links 31 are disconnected from the stub tongue. Also the extension sections of the connecting rods 34^a, 35^a, and 36^a, and shaft 5 are disconnected from the forward portions of said members, and disconnected also from the controlling levers and hand wheel. The link 48 is disconnected at its rear end from the bracket plate 39 by lifting the collar 45 from the stud 44 thereon, and the plate 49 to which the opposite end of the rod is jointed is disconnected from the beam 1^c. The base plate 38ª of the supporting frame 38 carrying the control levers, is now unbolted from the bracket plate 39 and the frame 38 removed and transferred to the beam 1ᶜ in which it is seated and clamped firmly in position by the clamping plates 50 before alluded to. The rear ends of the forward portions of the connecting rods 34ª, etc., are connected with the respective control levers and the hand wheel 37 applied to the rear end of the shaft 5. The parts will now appear as shown in Fig. 8. The binder frame being now free from the tractor, it is turned around so that the grain end of the platform will be next the tractor. The opposite end of the binder is elevated to lift the bull wheel off the ground, and the two transport wheels 60 (Fig. 8) are applied as usual to support the frame at this end. The grain end of the platform is now attached to the tractor by means of a special supporting and connecting member shown more particularly in Figs. 9 and 10, and comprising an open rectangular frame 61 preferably formed of angle iron and consisting of side bars 61ª and 61ᵇ and end bars 61ᶜ and 61ᵈ, which bars are connected fixedly together at their ends to form a unitary frame structure. This connecting frame is of a form to extend beneath the end of the platform and to be connected therewith in such position as to project horizontally beyond the same and surround the grain wheel X as shown in Fig. 10. To adapt the connecting frame to be readily and speedily attached to the platform frame and to be detached therefrom, a rearwardly extending arm 62 is fixed to the frame bars 61ᶜ and 61ᵇ and is adapted, when the connecting frame is in position, to extend in a hole 63 in a cross bar 64 on the platform frame, by which means the rear end of the connecting frame is supported. The two side bars 61ª and 61ᵇ near their forward ends have fixed to them lugs 65 which bear against the rear side of a transverse bar 66 fixed to the platform frame, and forward of these lugs the said side bars have latches 67 pivoted to them so that they may be swung laterally and engaged over the upper side of the bar 66, locking pins 68 being provided and being insertable in registering holes in the latches and side bars to hold the latches in locking position. By this means the frame 61 is supported at its front and is prevented from relative endwise movement. At one side the platform frame has fixed to it a lug 69 which extends downwardly at the outer edge of the side bar 61ª of the frame 61 and horizontally beneath the same, by which means the connecting frame is prevented from side movement and supported at this point.

In applying the connecting frame and attaching it to the platform frame, the latter is first elevated to lift the grain wheel off the ground. The connecting frame is then thrust endwise beneath the wheel, and the arm 62 entered in the hole 63, whereupon the frame is elevated at its front and engaged with the under side of the cross bar 66, with the lugs 65 bearing against the rear side of the bar, the frame bar 61ª being at the same time engaged over the horizontal end of the lug 69. The latches 67 are now swung laterally so as to engage the bar 66 and are locked in position by the locking pins before alluded to. The connecting frame is now in place ready for connection with the tractor. This is accomplished by means of a pin 70 which is passed through registering holes in a lug 71 swiveled to the frame bar 61ᵈ of the connecting frame, and in two plates 72 extending rearwardly from the rear end of the stub tongue 23 of the tractor truck and receiving the lug between them. The stub tongue is then raised to a horizontal position and locked in such position to hold the platform elevated, by means of a bolt 73 (Fig. 9) which is passed through registering holes 74 in the two rear vertical frame bars 2ᵉ of the truck and through a hole in the tongue. The binder is now fully connected with the tractor in operative position for transportation, and the driver occupies a seat 75 (Figs. 8 and 9) sustained by the truck between the same and the adjacent end of the platform. This seat is carried by a seat spring 76 which is detachably interlocked with the truck frame so that it may be applied when the binder is to be connected for transportation, and may be detached when the binder is connected for operation. The spring rests near its forward end upon a horizontal bracket plate 77 (Fig. 9) and extends between the two rear bars and the truck frame and between two pins 78 projecting upwardly from the plate 77, and forward of this plate the spring engages against the under edges of the two rear cross plates 9ª before alluded to, in which position it is held by a clamping hook 79 fastened to the extremity of the spring and engaging over one of the upper bars of the truck frame.

In order to limit the lateral rocking motions of the power unit relatively to the supporting truck about the fore and aft axes of the supporting pins 9, I apply to the upper horizontal bars 2ᵇ of the supporting truck, a bracket 80 provided with oppositely projecting horizontal stop arms 81 which are normally spaced some distance from the under side of the beam 1ᶜ, but which are adapted to be engaged by said beam in the event of the undue lateral rocking of the same and thus limit said motion.

It will be observed that by reason of the form and construction of the draft connections between the truck and implement, which connections are pivoted at their forward ends on the horizontal pivot bolt 24 and at their rear ends on the horizontal aligned axes 25 and 27, the implement will trail behind the truck and will be capable of a movement up and down about the axis 24 relative to the truck, whereby the truck and implement will accommodate themselves to the unevenness in the surface of the ground, and whereby the weight of the power unit and truck will be prevented from being imposed on the implement. Also it will be observed that due to the connection of the adjusting lever 28 with the stub tongue 23, this tongue may be adjusted up and down relative to the truck, which action will correspondingly adjust the implement up and down, and thereby raise and lower the forward portion carrying the cutter bar, the said implement in its different adjustments being always capable of an up and down movement relative to the tractor.

Due to the form and construction of the connections between the implement and the truck, the implement may be very readily and speedily attached and detached therefrom in order to enable it to be drawn in operative position for operation in the field, or to enable it to be drawn in inoperative position as for transportation over roads or from field to field, etc.

This application is a division of my prior application, Serial No. 245,410, filed July 17, 1918.

While in the accompanying drawings and foregoing description, I have set forth my invention in the particular detailed form and construction which I prefer to adopt, it will be understood that these details may be variously changed and modified without departing from the limits of the invention; and further it will be understood that the invention is not limited to any particular form or construction of the parts, except in so far as such limtiations are specified in the claims.

Having thus described my invention, what I claim is:

1. The combination of a tractor, an implement detachably connected thereto to trail behind the tractor in operative position, a driver's seat on the implement, means for controlling the tractor from the driver's seat when the implement is connected in operative position, means associated with the implement for connecting it in inoperative position to the tractor, a driver's seat detachably connected with the tractor, said tractor controlling means being operable from said detachable seat when the latter is attached to the tractor.

2. The combination of a tractor, a draft device connected thereto and movable in a substantially vertical plane, an implement connected to the draft device, said implement having mechanism associated therewith so that it may be disconnected from the draft device and reconnected in inoperative position for transportation, and means for holding the draft device against movement in a vertical plane when the implement is connected in inoperative position so that the draft device will serve to support and rigidly hold the implement while it is being transported.

3. The combination of a tractor, a grain binder having a cutter bar, a draft device connecting the tractor and binder and movable in a substantially vertical plane, means for moving the draft device to raise and lower the binder cutter bar, mechanism detachably connected with the binder and serving to connect it with the draft device for transportation purposes, and means for holding the draft device against vertical movement when the binder is connected in transport position.

4. The combination with a two-wheel tractor of a binder having a cutter bar, means for tilting the binder to adjust the height of the cutter bar, means connecting the binder and tractor for stabilizing them and for transmitting the draft of the tractor to the binder, said means permitting the binder to be tilted when the binder is connected in operative position, means associated with the binder for connecting it in transport position, and mechanism associated with the draft means for converting said means into a rigid draft connection for pulling the binder and stabilizing it when it is connected in transport position.

5. A hitch for connecting a binder having a cutter bar, to a front wheeled drive tractor, comprising a stabilizing truck connectable to a tractor, draft mechanism connecting the truck and binder so that, when the binder is in operative position, it may be tilted to vary the height of the cutter bar and at the same time be free to move about a horizontal transverse axis in all its adjusted positions, and means for converting the draft mechanism into a rigid draft connection for pulling the binder and stabilizing it when the binder is connected in transport position.

6. The combination with a tractor of a binder having a cutter bar, means for tilting the binder to vary the height of the cutter bar, a draft connection between the tractor and binder pivoted to swing about a substantially vertical axis to permit the binder to move about a transverse horizontal axis, said draft connection including two members pivoted together on a substantially transverse horizontal axis so that the binder may be tilted, and means associated with said draft connection to convert it into a rigid draft connection for use in stabilizing and pulling the binder when the binder is connected in transport position.

7. The combination with a two wheel tractor of the unstable type of a binder having a cutter bar, means for tilting the binder to adjust the height of the cutter bar, a stabilizing truck connected to the tractor, a draft tongue pivoted at its forward end to the stabilizing truck and at its rear end to a second tongue member connected to the binder, means on the binder connected to one of the tongue members for varying their position to vary the height of the cutter bar, and means for connecting said draft tongue rigidly to the stabilizing truck, to transform it into a rigid draft connection for pulling and stabilizing the binder when the same is connected in transport position.

8. The combination with a tractor of the unstable type of a binder having a cutter bar, a stabilizing truck pivoted to the tractor to swing about a substantially longitudinal, horizontal axis, and means connecting the truck and binder permitting the latter, while in operative position, to be adjusted to vary the height of the cutter bar and to adjust itself relative to the tractor about a transverse, horizontal axis, said means also acting as a rigid draft connection for the binder when in transport position.

In testimony whereof I have affixed my signature hereto.

ISAAC TROLLEY.